United States Patent Office.

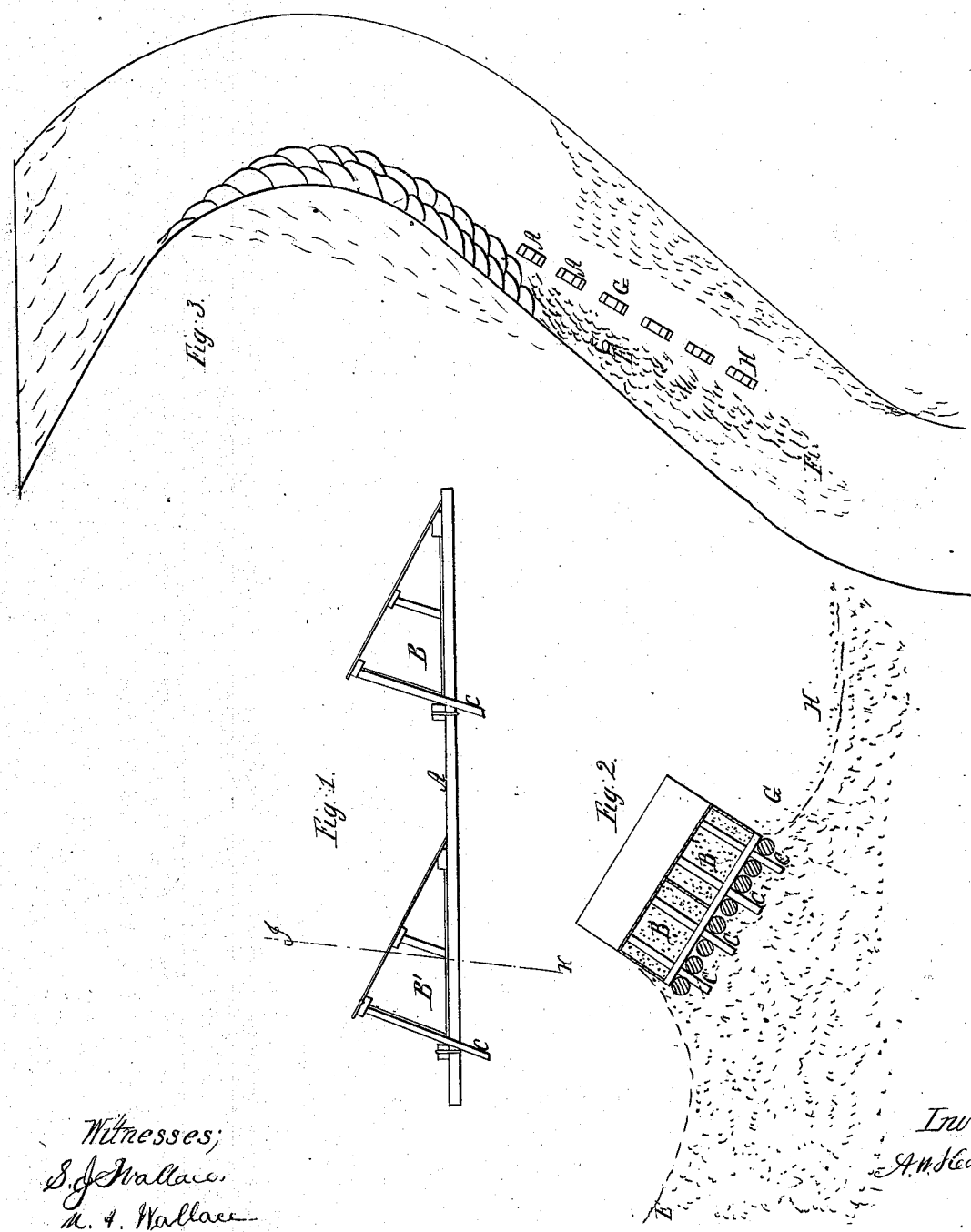

AARON WORD HARLAN, OF CROTON, IOWA.

Letters Patent No. 104,586, dated June 21, 1870.

IMPROVED DEVICE FOR FORMING CHANNELS IN RIVERS.

The Schedule referred to in these Letters Patent and making part of the same.

*To all whom it may concern:*

Be it known that I, AARON WORD HARLAN, of Croton, Lee county, State of Iowa, have invented a new and useful Improvement in Rafts and means for River Improvement; and I do hereby declare the following to be a full, clear, and exact description thereof, reference being had to the accompanying drawing and to the letters of reference marked thereon, in which—

Figure 1 is a sectional view of my raft, as it lies on the river bottom.

Figure 2 is a section across the same.

Figure 3 is a plan, showing the system of arrangement of the rafts in the river.

The object of this invention is to so improve the channel of rivers as to give them permanent depth for navigation.

To do this I make and employ a system of rafts, sunken in the river-bed substantially as shown and set forth.

I make a raft, A, of cottonwood logs, or other suitable materials, of size suited to size and force of the current, say, for a large river, of from one hundred to one hundred and fifty feet long, and, perhaps, one-fourth as wide, depending upon the depth of the channel.

Upon the raft I place a sand-box, B, to be filled with sand, to sink it, or there may be two boxes, B and B', one at each end across the raft, or any other arrangement thereon suitable.

The sand-box B I make with its top or surface exposed to the current, arranged as shown, that is, raised from the raft from the forward end to the rear, at an inclination backward and upward, of, say, thirty-five degrees from the raft. This, as the raft lies on the bottom, raises the water passing over it, and effects the current around it, so that the tendency is for the sand to be washed away from above and around the raft, and to form a sand-bank back of it, as is the well-known effect of obstructions in rivers, while, at the same time, the force of the current presses the sand-box and raft to the bottom, rendering it immovable. I make parts C C, under the raft, to rest in the sand, as anchors.

I place the raft with its length slightly diagonal to the stream, to the side on which I wish a channel to be opened, and from the side on which I wish the sand-bank formed below it.

To open a channel for a considerable distance in a shallow part, I begin at a suitable point, say on one side of the river, and place a line of rafts at suitable intervals after each other, down the river, and diagonally across it, so that a channel will be formed along the line and across the shallow part, on the side of the rafts toward the stream, while, as a consequence, a sand-bank, or series of them, will be formed on the other side of the line, as at E F, the open channel being G H.

To close up a channel around an island, and join it to the main land, I make the same arrangement at a suitable distance above, inclining from the shore to a point above the point of the island, so that the sand-bank will form from the point of the island upward to the shore.

The same means can be used for changing the channel and width of the river bed, and for connecting its curves.

What I claim is—

1. The channel-improvement raft, formed substantially as set forth, of long timbers, forming a long base, and two, or any number, of transverse elevated parts, with their surface sloping as from the current thereon, and covering but a portion of the surface of the long raft, and arranged for the use set forth.

2. The system of rafts made and arranged substantially as set forth, for river improvement.

AARON WORD HARLAN.

Witnesses:
SAMUEL JACOB WALLACE,
FLORIANA LAFOUNTAIN.